W. SCHWERDTFEGER.
METHOD OF AND ARRANGEMENT FOR BRAKING INTERNAL COMBUSTION MOTORS.
APPLICATION FILED JULY 31, 1915.
1,161,417.
Patented Nov. 23, 1915.
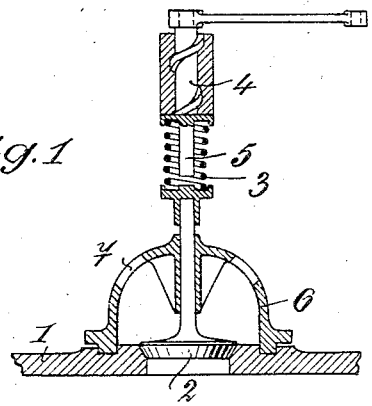
Fig. 1
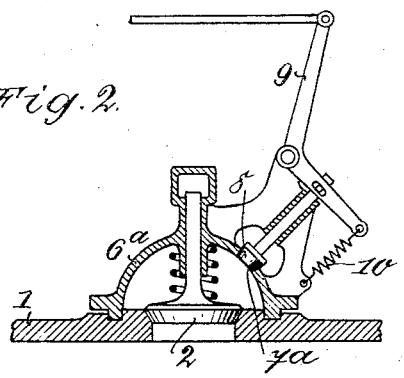
Fig. 2.
Fig. 3.
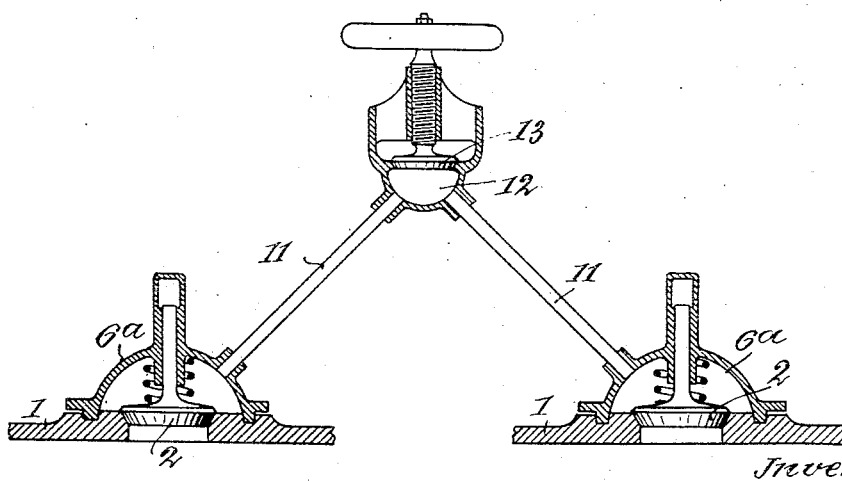
Inventor
Walter Schwerdtfeger.
by
Attorneys

UNITED STATES PATENT OFFICE.

WALTER SCHWERDTFEGER, OF STUTTGART-UNTERTÜRKHEIM, GERMANY, ASSIGNOR TO DAIMLER-MOTOREN-GESELLSCHAFT, OF UNTERTÜRKHEIM, GERMANY, A CORPORATION OF GERMANY.

METHOD OF AND ARRANGEMENT FOR BRAKING INTERNAL-COMBUSTION MOTORS.

1,161,417.      Specification of Letters Patent.      Patented Nov. 23, 1915.

Application filed July 31, 1915. Serial No. 42,993.

*To all whom it may concern:*

Be it known that I, WALTER SCHWERDTFEGER, subject of the Emperor of Germany, residing at 24ᴮ Panoramastrasse, Stuttgart-Untertürkheim, Germany, have invented certain new and useful Improvements in Methods of and Arrangements for Braking Internal-Combustion Motors, of which the following is a specification.

The present invention relates to a method and an arrangement for braking internal combustion motors. It is old to use such motors serving for the propulsion of vehicles for braking such vehicles when they are running down an incline, the pressure acting upon the piston during compression effecting the braking, while the expansion during the expansion stroke is neutralized by previously blowing off the air compressed within the working cylinder. The methods based on this principle show the disadvantage of requiring a special control of the admission and exhaust valves for expelling the compressed air, the means for controlling the valves presenting rather great difficulties of construction. In order to obviate this drawback, in the method according to the present invention the effect of expansion is neutralized, without changing the normal means used for controlling the motor, by opening, whenever the motor is to be subjected to a braking action, a special exhaust port normally closed, this port then allowing the air compressed during the compression stroke to escape from the working cylinder in a more or less throttled condition. The throttling is designed to regulate the braking effect. Preferably the admission of fuel to the motor is interrupted before braking.

The special outlet for the air compressed in the cylinder may be closed either by automatic valves opening on a certain pressure being transgressed, or by controlled valves. If automatic valves are used, the air compressed in the cylinder is allowed to escape more or less early near the end of the compression stroke, according to the load acting on the valves. It is however possible also to let the compressed air escape during the expansion stroke in order to utilize the compression stroke for the braking exclusively. In this case the valves closing the special outlet must be controlled in such a way as to open only after the compression stroke is completed.

When the compressed air is permitted to escape at the end of the compression stroke the braking effect is increased the more the air is being throttled or in other words the nearer the escape valve is to its closed position, while if the air is expelled during the expansion stroke, the braking effect under the same throttling conditions or valve adjustment will be less owing to the fact that the compressed air tends to expand and if permitted to escape slowly will exert a driving force on the piston during the expansion stroke. Therefore it is possible, in both cases, to vary the braking effect by throttling the escaping air more or less.

In all cases the special valves provided for the exhaust of the compressed air must be arranged to be kept closed as long as the engine is doing motor work.

The valves are each preferably arranged within a small casing. These casings may be closed airtight or may be opened more or less. By closing such a casing altogther the valve is kept closed in order to insure the working of the motor as a power engine. When the casing is opened more or less, the exhaust valve is free to be opened and to allow the air compressed in the cylinder to escape.

In multi-cylinder engines a simultaneous control of the blow-off valves can be effected in a simple way by connecting the casings inclosing said valves by aid of suitable tubing with a casing common to all and provided with an aperture capable of being closed or more or less opened. By adjusting this aperture it is possible to control the throttling of the air for all blow-off valves at a time.

In the drawings accompanying this specification Figures 1 and 2 are vertical sectional views illustrating different valve arrangements for blowing off the air according to the present invention, and Fig. 3 is a similar view illustrating a valve arrangement in connection with a multi-cylinder motor.

Referring to Fig. 1, 1 is the compression chamber wall, 2 is the blow-off valve, 6 is a cap provided with perforations 7 and serving as a guide for said valve, 3 is a spring pressing the valve against its seat. The tension of spring 3 can be varied by means of a screw spindle 4 acting upon said spring. By screwing said spindle down until its projection 5 touches the valve stem, the valve can be fixed on its seat thus preventing it from being opened while the motor is working as a power-engine.

Referring to Fig. 2, the valve 2 is inclosed within a casing 6ª provided with a single opening 7ª adapted to be closed by a small valve 8 pressed against its seat by a spring 10 and controlled by a lever 9. If the small valve 8 is more or less opened, valve 2 will during the compression stroke of the piston be lifted owing to the excess of pressure and will allow the compressed air to escape into casing 6ª. The compressed air is then free to escape through valve 8, the velocity of the air corresponding to the width of the passage left by valve 8. Thus by lifting valve 8 more or less the pressure within the casing 6 and the braking effect can be varied within wide limits. If it is desired to make the motor work again as a power engine, the blow-off valve 2 must be fixed to its seat against the action of the explosion pressure. This is effected by closing valve 8; if, after this has been done, the pressure within casing 6ª is still lower than the explosion pressure, part of the combustion gases will after explosion pass over into casing 6ª, until the pressure within the casing is equal to the explosion pressure. The blow-off valve is then fixed against the explosion pressure.

Referring to Fig. 3, the blow-off valves 2 of two cylinders of a multi-cylinder motor are controlled jointly. Each valve is inclosed within a closed casing 6ª, and the casings 6ª are connected with a casing 12 common to both of them by tubes 11. Casing 12 is provided with a valve 13 adapted to be opened for the purpose of braking the car by aid of the motor, the braking effect corresponding to the width of opening of said valve. All the casings 6ª being connected to casing 12, the braking effect is regulated simultaneously for all the cylinders, and by completely closing valve 13 all the valves 2 are fixed at a time against the action of the explosion pressure.

In the cases of automatic blow-off valves being used, whenever the inner dead center is reached and passed there will remain in the compression chamber compressed air which will act positively upon the piston during the expansion stroke, only part of the compressed air escaping through the blow-off valves. In order to avoid such positive action, which may be undesirable, if a greater braking effect is wanted, it is preferable to provide for an expansion of the compressed air remaining in the compression chamber by bringing the chamber into communication with the outer air after the piston has completed its compression stroke. This may be effected by mechanically controlling the valves 8 (Fig. 2) or 13 (Fig. 3) in such a way as to open them quickly, after the compression stroke is ended, and to keep them open so that the compressed air within the compression chamber is expanded by simply lifting the blow-off valves 2 off their seats against the feeble action of the springs acting upon them, and escaping into the atmosphere.

The devices shown in the drawings and illustrating the way of practicing the new method may also be used for facilitating the starting of the motor by varying the degree of compression by loading the blow-off valves correspondingly. By controlling the valves 8 or 13 in a suitable way they are closed before ignition, no escape of combustion gases taking place and the full force of the explosion acting upon the piston. The controlled valves 8 and 13 may be replaced by other types of valves if desired.

I claim:—

1. The method of braking internal combustion motors which consists in opposing the inward movement of the pistons by compressed air confined in the cylinders, permitting the air to escape from said cylinders to relieve the compression pressure, and adjustably regulating the escape of said air.

2. The method of braking internal combustion motors which consists in opposing the inward movement of the pistons by compressed air confined in the cylinders, permitting the air to escape from said cylinders during said inward movement of the pistons to relieve the compression pressure and adjustably regulating the escape of said air.

3. The method of braking internal combustion motors which consists in opposing the inward movement of the pistons by compressed air confined in the cylinders, permitting the air to escape from said cylinders during said inward movement of the pistons to relieve the compression pressure, permitting the escape of said air to continue during a part of an outward stroke of said piston and adjustably regulating the escape of said air.

4. In an internal combustion motor, in combination, an explosion-cylinder, a special blow-off valve adapted to open automatically upon a predetermined pressure being reached in said cylinder, and means for normally keeping said blow-off valve closed.

5. In an internal combustion engine, in combination, a plurality of explosion cylinders, and a special blow-off valve provided for each cylinder, said blow-off valves being adapted to open automatically upon a predetermined pressure being reached within the cylinders, and means for normally keeping said blow-off valves closed.

6. In an internal combustion motor, in combination, an explosion-cylinder, a special blow-off valve, adapted to open automatically upon a predetermined pressure being reached in said cylinder, an air-tight casing inclosing said blow-off valve and means for temporarily connecting the interior of said casing with the atmosphere.

7. In an internal combustion motor, in combination, an explosion-cylinder, a special blow-off valve adapted to open automatically upon a predetermined pressure being reached in said cylinder and an air-tight casing inclosing said blow-off valve and a hand-controlled valve on said casing adapted to connect its interior with the atmosphere.

8. In an internal combustion engine, in combination, a plurality of explosion cylinders, and a special blow-off valve provided for each cylinder, said blow-off valves being adapted to open automatically upon a predetermined pressure being reached within the cylinders and common means for normally keeping all the blow-off valves closed and for releasing them simultaneously.

9. In an internal combustion engine, in combination, a plurality of explosion cylinders, and a special blow-off valve provided for each cylinder, said blow-off valves being adapted to open automatically upon a predetermined pressure being reached within the cylinders, an air-tight casing inclosing each blow-off valve and common means for simultaneously connecting the interior of said casings with the atmosphere.

10. In an internal combustion engine, in combination, a plurality of explosion cylinders, and a special blow-off valve provided for each cylinder, said blow-off valves being adapted to open automatically upon a predetermined pressure being reached within the cylinders, an air-tight casing inclosing each blow-off valve, a central air-tight casing, tubes connecting all the valve-casings with the central casing and means for temporarily connecting the interior of said central casing with the atmosphere.

In testimony whereof I affix my signature.

WALTER SCHWERDTFEGER.